Sept. 15, 1953  K. A. REES ET AL  2,652,317
REACTOR INLET
Filed April 1, 1949
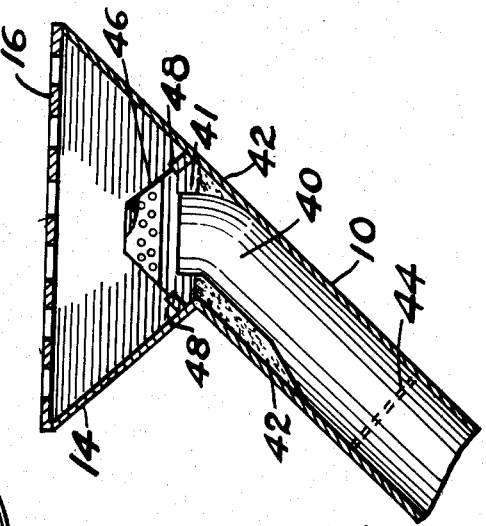
Fig.-3
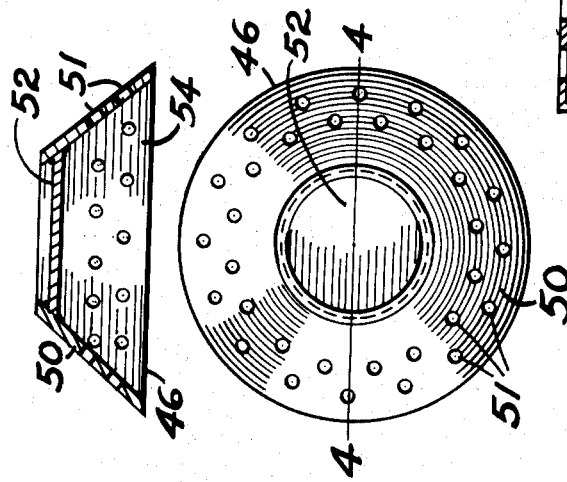
Fig.-4
Fig.-2
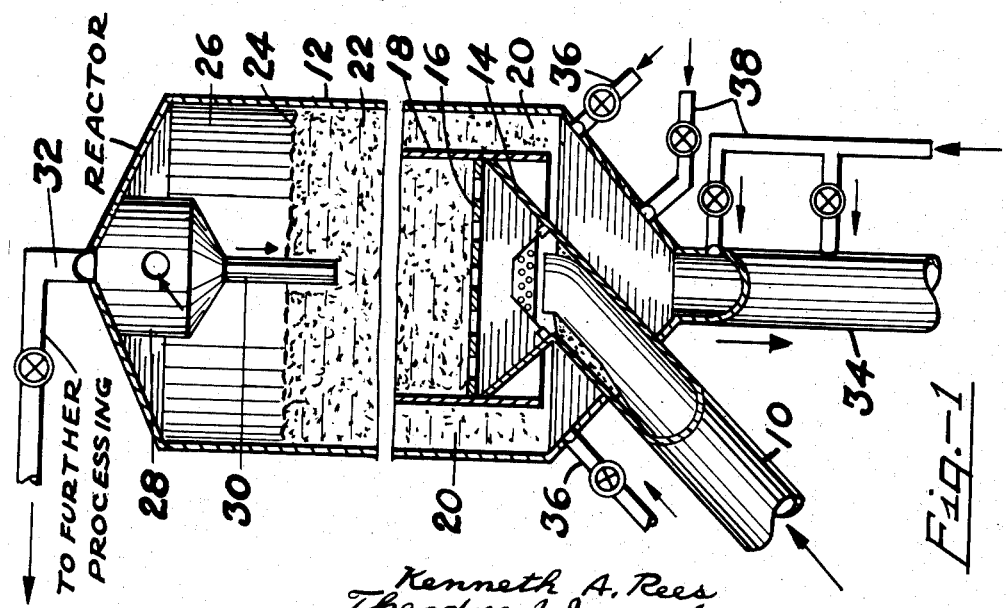
Fig.-1
Kenneth A. Rees
Theodore J. Innes, Jr.
Leonard M. Williams
Robert W. Williams
Inventors
By George J. Silbury Attorney Patented Sept. 15, 1953

2,652,317

UNITED STATES PATENT OFFICE 2,652,317

REACTOR INLET

Kenneth A. Rees, Theodore J. Innes, Jr., Leonard M. Williams, and Robert W. Williams, Baton Rouge, La., assignors to Standard Oil Development Company, a corporation of Delaware Application April 1, 1949, Serial No. 84,924

3 Claims. (Cl. 23—288)

This invention relates to the catalytic conversion of hydrocarbons, and more particularly to an improved reactor inlet design for catalytic hydrocarbon conversion processes.

In the catalytic conversion of hydrocarbons in which the fluid-solid technique is used, the hydrocarbon to be converted either in the form of hydrocarbon vapors or as a liquid is mixed with hot finely divided particles of catalytic materials prior to introduction into a reaction zone. If the hydrocarbon is in liquid form the contact with the hot catalyst vaporizes the hydrocarbon feed and the catalyst is borne into the reaction zone by the hydrocarbon vapors.

In many of the existing catalytic cracking units the hydrocarbon feed is admixed with hot regenerated catalyst and the mixture enters the reactor vessel at an angle. The stream of catalyst particles and hydrocarbon vapors pass through an inverted cone member and a perforated distributor plate that is superimposed on the inverted cone member. The function of the perforated distributor plate is to distribute the stream of catalyst and vapors equally across the area of the bottom of the reactor vessel.

After the stream of vapors and catalyst particles passes through the distributor plate, the vapor velocity decreases due to the greater cross-sectional area of the reactor vessel and there is formed in the reactor vessel above the distributor plate a bed of catalyst particles that is known to the art as a "fluid bed." This fluid bed has a definite level and is characterized by a turbulent mixing throughout, the hydrocarbon vapors escaping from the surface and the catalyst particles remaining in the bed. Due to the extreme degree of turbulence, the temperature and density remain substantially constant throughout the bed, and complete intimate contact between the hydrocarbon vapors and catalyst particles is obtained.

Among the major problems confronting refiners using catalytic cracking units of the type described above, are the problems of distributor plate erosion and premature separation of catalyst and vapor particles. Because of momentum effects the heavier catalyst particles of the catalyst-vapor mixture tend to move in a straight line and are more difficult to turn than the lighter vapor particles. As a result premature separation of catalyst and vapor particles occurs and a high concentration of catalyst passes through the distributor plate on the side opposite to the inlet line. This action causes localized erosion of the distributor plate due to the increase in the amount of catalyst particles passing through the section of the distributor plate opposite the inlet line. A less favorable distribution of yields of cracked products follows due to the premature separation of catalyst and vapors, this separation resulting in a tendency to overcrack portions of the feed and to undercrack other portions.

It is the object of this invention to overcome these difficulties by providing an improved reactor inlet apparatus to insure substantially equal distribution of the catalyst-vapor mixture across the distributor plate.

Briefly stated the invention comprises placing a pipe bend in the inlet line to the reactor and inserting a dispersing unit above the inlet line to receive the stream of catalyst-vapor mixture and distribute it equally across the distributor plate.

The invention will be more readily understood by reference to the accompanying drawing in which:

Fig. 1 represents a diagrammatic view of a bottom-draw-off type reactor provided with the reactor inlet improvement;

Fig. 2 is an enlarged vertical sectional view of the reactor inlet;

Fig. 3 is an enlarged top plan view of the dispensing unit of Fig. 2; and

Fig. 4 is a vertical cross section of the dispersing unit of Fig. 3 taken along the line 4—4.

Referring now to Fig. 1, numeral 10 designates an inlet line through which a mixture of hot catalyst and hydrocarbon vapors is admitted to reactor vessel 12.

Inlet line 10 communicates with an inverted cone member 14 upon which is superimposed a perforated distributing plate 16. Surrounding the inverted cone member 14 and extending above and below the distributing plate 16 there is a cylindrical member 18 which forms, with the sides of reactor 12, an annular stripping chamber 20.

The velocity of the vapors is so selected that the catalyst particles form a fluid bed within reactor 12 having a dense phase 22, a definite bed level 24, and a less dense phase 26. Superficial velocities ranging from 0.2 ft. per sec. to 3.0 feet per second are ordinarily used, depending upon the catalyst used and the conditions of operation desired. Temperatures ranging from 850° F. to 1150° F. are ordinarily maintained within the reaction zone, depending also upon the desired conditions of operation.

After conversion the reaction products pass into the less dense phase 26 and into cyclone separator 28 arranged in the top of vessel 12 where any entrained catalyst particles are separated from the vapors and returned to the dense phase 22 beneath bed level 24 by means of dip pipe 30. The reaction products pass through line 32 to further processing in equipment not shown.

During the conversion process, the catalyst particles become contaminated with surface deposits of carbonaceous materials and their catalytic activity becomes impaired. Removal of carbonaceous deposits from the surface of the catalyst, or regeneration, is ordinarily accomplished by removing the contaminated or spent catalyst to a regeneration zone and passing through the spent catalyst a stream of oxidizing gas, such as air. The velocity of the gas is so selected that the spent catalyst particles are maintained in a fluid bed within the regenerator. Superficial velocities within a range of from 0.5 to 3.0 feet per second may be used. Within the fluid bed the carbonaceous deposits are burned off the catalyst particles by the oxygen in the oxidizing gas and the regenerated catalyst particles are removed from the regenerating zone, admixed with fresh hydrocarbon feed and recycled to the reactor vessel.

The bottom of reactor 12 communicates with a standpipe 34 through which spent catalyst is withdrawn from the reactor to a regeneration zone, not shown. The spent catalyst passes downwardly through annular stripping chamber 20 where it is stripped of entrained hydrocarbon vapors by means of a stripping gas such as steam, admitted through lines 36. The catalyst in the bottom portion of reactor 12 and in standpipe 34 is maintained in a fluid state by the injection of an aeration gas such as steam through one or more aeration lines 38. At the bottom of standpipe 34 and not shown is a slide valve which regulates the amount of catalyst withdrawn from reactor 12.

The specific features of the new reactor inlet design are shown in Fig. 2 which is an enlarged view of the inverted cone member 14 shown in Fig. 1.

Positioned within the upper portion of inlet line 10 is a pipe bend 40 which is so shaped that the catalyst-vapor mixture is turned from the angle of the inlet line 10 to the vertical as shown at 41. The pipe bend may be of a reduced area as shown, or it may be of the same size as the inlet line 10 with the upper end turned up. It is firmly held in place in inlet line 10 by filling the spaces between the pipe bend and the inlet line with some semi-fluid material that sets to a rigid mass, such as concrete, as shown at 42. The lower end of the pipe bend member 40 is rigidly attached to inlet line 10 by means such as a continuous filet weld, as shown at 44. It is to be understood of course, that other means of securing the pipe bend member in the inlet line 10 may be used without departing from the scope of the invention. For instance, the inlet line 10 may have its upper end formed with a vertical portion similar to 41.

Positioned centrally over the exit of the pipe bend member 40, and slightly above, is dispersing member 46. This member is rigidly held in place in the bottom portion of inverted cone 14 by securing means such as braces as shown at 48, welded to the dispersing member and to the sides of the inverted cone member 14.

The dispersing member 46 is shown more in detail in Figs. 3 and 4. The member is in the shape of a frustum of a cone. The side wall 50 of the dispersing member 46 is perforated, two rows of holes being shown at 51. The number and size of the holes will be determined by the pressure drop desired. The top of dispersing member 46 is a solid plate as shown at 52, and the bottom 54 is open to receive the catalyst-vapor mixture from inlet 10 and pipe bend member 40.

The details of the construction of dispersing member 46 are more clearly shown in Fig. 4 which is a vertical cross-sectional view of the dispersing member taken along the line 4—4 of Fig. 3.

Catalyst-vapor mixture being admitted through inlet line 10 enters pipe bend member 40 and the angle of flow is changed to the vertical in the outlet end 41 of said pipe bend member. This change in the flow angle prevents the separation of the catalyst particles from the vapors and maintains the uniformity of the mixture. From the pipe bend member 40 the mixture passes into dispersing member 46, striking the solid top portion 52. A complete change of direction occurs here and some of the heavier catalyst particles deposit out of the catalyst-vapor mixture and form a cushion of catalyst on the underneath side of top plate 52, effectively eliminating any substantial erosion of the dispersing member 46.

After the first few seconds of operation the mixture of catalyst and vapor no longer separate, but pass through the holes 51 in the sides of dispersing member 46 as an equally dispersed mixture of catalyst in vapor and are equally distributed below the perforated distributor plate 16 for passage therethrough. This equal distribution of catalyst across the distributor plate substantially completely eliminates any localized erosion of the distributor plate 16.

What is claimed is:

1. An apparatus of the character described which comprises a reaction vessel, an inverted cone member in the bottom portion thereof, a perforated grid member superimposed on the outlet end of said inverted cone member, a cylindrical member adjacent to and surrounding said inverted cone member and extending above and below said perforated grid member forming an annular stripping zone with the sides of said reaction vessel, an inlet line communicating with the bottom portion of said inverted cone member at an angle to the vertical axis of said reaction vessel for the introduction of a mixture of solids and gases, tubular guiding means centrally positioned at the discharge end of said inlet line for changing the direction of flow of the mixture of solids and gases in said inlet line to vertically upward, dispersing means within said inverted cone member below said perforated grid member and positioned centrally above said guiding means for distributing said mixture uniformly over the bottom of said perforated grid member, an outlet line in the upper portion of said reaction vessel for removing gases therefrom and an outlet line in the lower portion of said reaction vessel for withdrawing solids therefrom.

2. An apparatus of the character described which comprises a reaction vessel, an inverted cone member in the bottom portion of said reaction vessel, a perforated grid member superimposed on the outlet end of said inverted cone member, a cylindrical member adjacent to and surrounding said inverted cone member and extending above and below said perforated grid member forming an annular stripping zone with the sides of said reaction vessel, an inlet line communicating with the bottom portion of said inverted cone member at an angle to the vertical axis of said reaction vessel for the introduction of a mixture of solids and gases to said inverted cone member, a pipe bend member located at the discharge end of said inlet line attached rigidly thereto, said pipe bend member being constructed and arranged to change the direction of flow of the mixture of solids and gases introduced through said inlet line from the line of the central axis of said inlet line to a line perpendicular to said perforated grid member, a frusto conical member having a solid top portion and a perforated side positioned centrally above said pipe bend member for receiving the mixture of solids and gases from said pipe bend member and dispersing the mixture equally across the bottom of said perforated grid member, an outlet line in the upper portion of said reaction vessel for removing gases therefrom and an outlet line in the lower portion of said reaction vessel for withdrawing solids therefrom.

3. An apparatus of the character described which comprises a reaction vessel, an inverted cone member in the bottom portion thereof having a bottom inlet end and an upper outlet end, a perforated grid member superimposed on the outlet end of said inverted cone member, a cylindrical member surrounding and adjacent to said inverted cone member and extending above and below said perforated grid member forming an annular stripping zone with the sides of said reaction vessel, an inlet line communicating with the inlet end of said inverted cone member for the introduction of a mixture of solids and gases to said inverted cone member, said inlet line forming an angle with the vertical axis of said reaction vessel, a pipe bend member centrally positioned at the discharge end of said inlet line and being constructed and arranged to change the direction of the flow of the mixture of solids and gases in said inlet line to vertically upward, said pipe bend member having a circumference at the lower end thereof substantially the same as the inlet line and at its upper end having a circumference substantially smaller than said inlet line, a frusto-conical dispersing member within said inverted cone member below said perforated grid member and positioned centrally above the outlet of said pipe bend member, said frusto-conical dispersing member having a solid top, a perforated side and an open bottom and adapted to receive a mixture of solids and gases from said pipe bend member and to distribute said mixture equally across the bottom of said perforated grid member, an outlet line in the upper portion of said reaction vessel for removing gases therefrom and an outlet line in the lower portion of said reaction vessel for removing solids therefrom.

KENNETH A. REES.
THEODORE J. INNES, Jr.
LEONARD M. WILLIAMS.
ROBERT W. WILLIAMS.

References Cited in the file of this patent

UNITED STATES PATENTS

| Number | Name | Date |
|---|---|---|
| 2,364,145 | Huppke et al. | Dec. 5, 1944 |
| 2,409,780 | Mekler | Oct. 22, 1946 |
| 2,415,755 | Ogorzaly et al. | Feb. 11, 1947 |
| 2,451,573 | Myers et al. | Oct. 19, 1948 |
| 2,461,172 | Pelzer | Feb. 8, 1949 |
| 2,491,099 | Fisher | Dec. 13, 1949 |
| 2,513,253 | Robinson | June 27, 1950 |
| 2,608,474 | Gilliam | Aug. 26, 1952 |